(12) United States Patent
Somerville

(10) Patent No.: US 8,269,389 B1
(45) Date of Patent: Sep. 18, 2012

(54) ELECTRICAL ENERGY GENERATOR AND METHOD

(76) Inventor: Cris D. Somerville, Cooperstown, ND (US)

( * ) Notice: Subject to any disclaimer, the term of this patent is extended or adjusted under 35 U.S.C. 154(b) by 552 days.

(21) Appl. No.: 12/533,376

(22) Filed: Jul. 31, 2009

(51) Int. Cl.
*H02K 21/00* (2006.01)
(52) U.S. Cl. ......... 310/112; 310/114; 310/209; 310/191
(58) Field of Classification Search .......... 310/112–114, 310/209, 191; 29/596–598; 290/44, 55
See application file for complete search history.

(56) References Cited

U.S. PATENT DOCUMENTS

| | | | |
|---|---|---|---|
| 2004/0041409 A1* | 3/2004 | Gabrys | 290/55 |
| 2006/0170302 A1* | 8/2006 | Watson | 310/209 |

* cited by examiner

*Primary Examiner* — Quyen Leung
*Assistant Examiner* — Leda Pham
(74) *Attorney, Agent, or Firm* — Dave Alan Lingbeck

(57) ABSTRACT

An electrical energy generator for generating optimal electrical energy at very low wind speeds and at very high wind speeds. The electrical energy generator includes a support assembly having an elongate support member, and also includes a rotor assembly being rotatably disposed upon the support assembly and having a plurality of vanes being movable by air for rotating the rotor assembly, and further includes a stator assembly being mounted upon the support assembly and including a stator member being movably disposed upon the support assembly for generating energy in cooperation with the rotor assembly, and an assembly for moving the stator member relative to the rotor assembly upon the support assembly.

11 Claims, 5 Drawing Sheets

ELECTRICAL ENERGY GENERATOR AND METHOD

BACKGROUND OF THE INVENTION

1. Field of the Invention

The present invention relates to generators and more particularly pertains to a new electrical energy generator for generating optimal electrical energy at very low and at very high wind speeds and also by any other external means.

2. Description of the Prior Art

The use of wind generators is known in the prior art. More specifically, wind generators heretofore devised and utilized are known to consist basically of familiar, expected and obvious structural configurations, notwithstanding the myriad of designs encompassed by the crowded prior art which have been developed for the fulfillment of countless objectives and requirements.

The prior art includes wind turbines having stators and rotors being supported upon a support structure with magnets being disposed about the rims of the stators and coils being disposed about the rims of the rotors. Wind-driven vanes are attached to the rotors so that wind will propel the vanes resulting in the rotors rotating with the coils passing through magnetic fields created by the magnets thus generating electrical energy. While these devices fulfill their respective, particular objectives and requirements, the aforementioned patents do not disclose a new electrical energy generator of the present invention.

SUMMARY OF THE INVENTION

The general purpose of the present invention, which will be described subsequently in greater detail, is to provide a new electrical energy generator which has many of the advantages of the wind generators mentioned heretofore and many novel features that result in a new electrical energy generator which is not anticipated, rendered obvious, suggested, or even implied by any of the prior art wind generators, either alone or in any combination thereof. The present invention includes a support assembly having an elongate support member, and also includes a rotor assembly being rotatably disposed upon the support assembly and having a plurality of vanes being movable by air for rotating the rotor assembly, and further includes a stator assembly being mounted upon the support assembly and including a stator member being movably disposed upon the support assembly for generating energy in cooperation with the rotor assembly, and an assembly for moving the stator member relative to the rotor assembly upon the support assembly. None of the prior art includes the combination of the elements of the present invention.

There has thus been outlined, rather broadly, the more important features of the electrical energy generator in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new electrical energy generator which has many of the advantages of the wind generators mentioned heretofore and many novel features that result in a new electrical energy generator which is not anticipated, rendered obvious, suggested, or even implied by any of the prior art wind generators, either alone or in any combination thereof.

Still another object of the present invention is to provide a new electrical energy generator for generating optimal electrical energy at very low wind speeds and at very high wind speeds.

Still yet another object of the present invention is to provide a new electrical energy generator that senses wind speed and accordingly adjusts the positioning of the coils relative to the magnets to reduce the load of the rotor member thus allowing the rotor member to rotate in very low winds.

Even still another object of the present invention is to provide a new electrical energy generator that minimizes the generation of heat at high wind speeds thus effectively generating maximum energy output.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
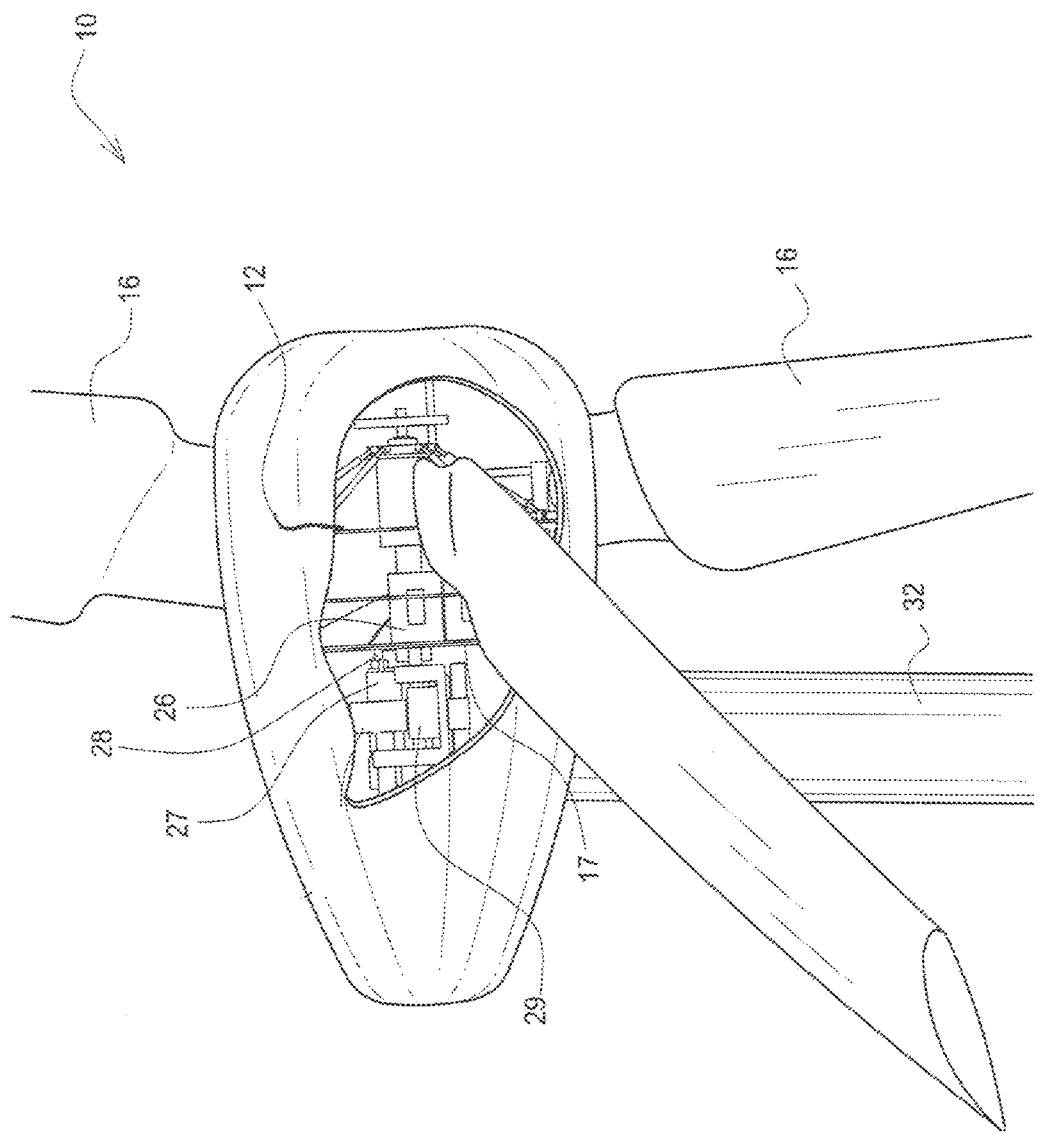
FIG. 1 is a perspective view of the electrical energy generator with a cutaway showing the rotor member and the stator member.
Figure 2:
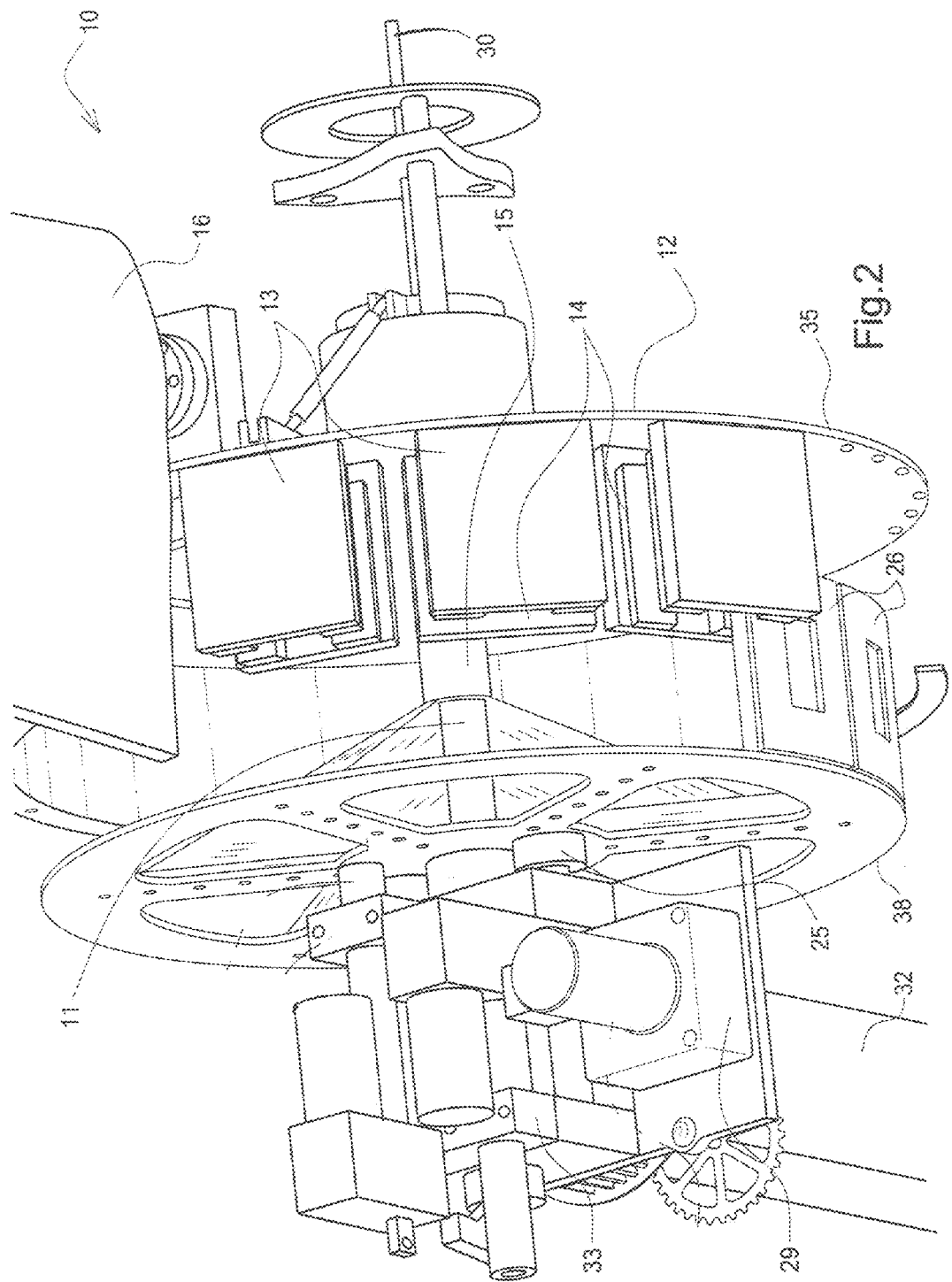
FIG. 2 is a perspective view of the stator and rotor assemblies with portions of the coils being immersed in the magnetic field.
Figure 3:
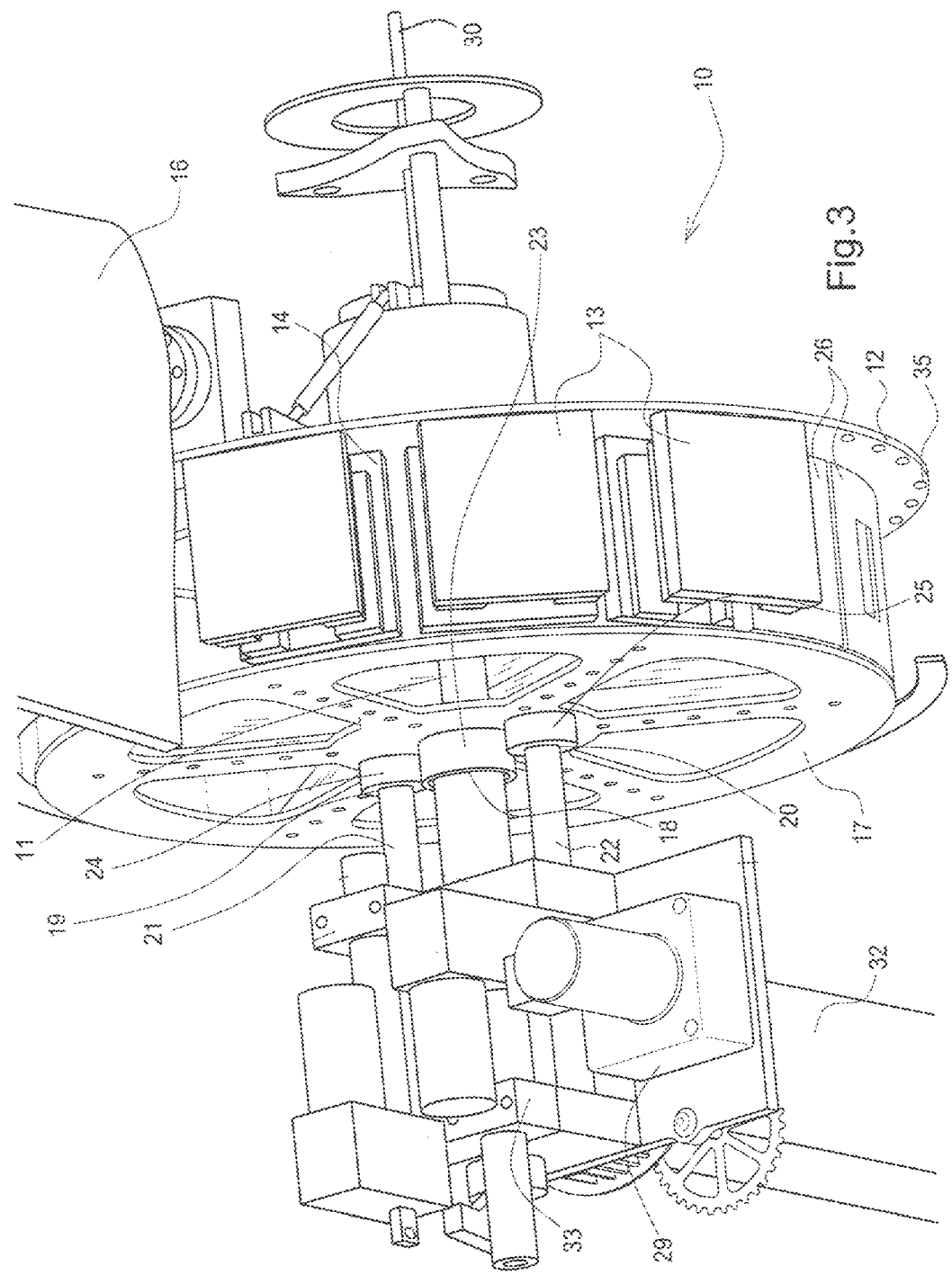
FIG. 3 is perspective view of the stator and rotor assemblies with the coils being completely immersed in the magnetic field between the rows of magnets.
Figure 4:
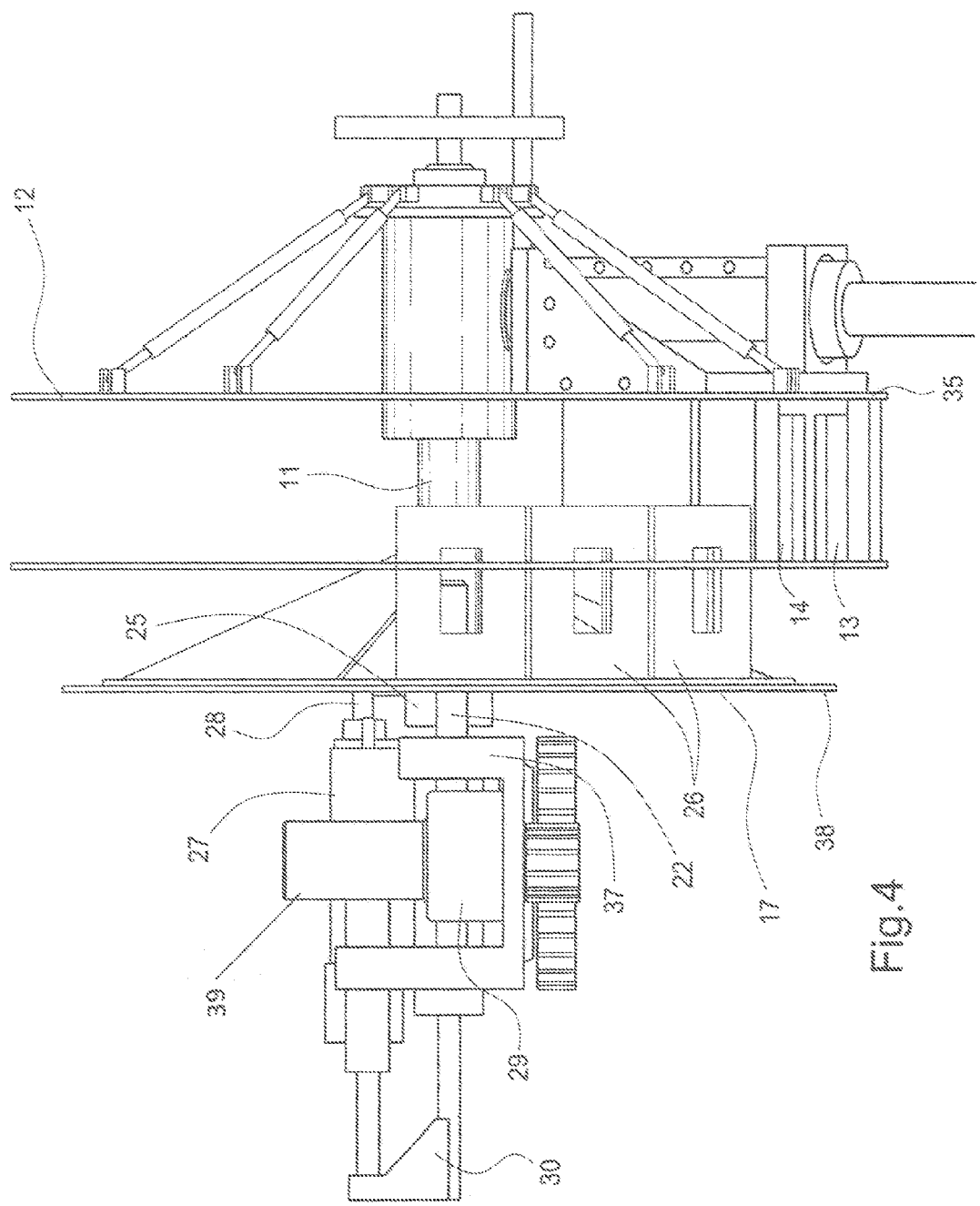
FIG. 4 is side elevational view of the stator and rotor assemblies showing portions of the coils being immersed in the magnetic field.

With reference now to the drawings, and in particular to FIGS. 1 through 5 thereof, a new electrical energy generator embodying the principles and concepts of the present invention and generally designated by the reference numeral 10 will be described.

As best illustrated in FIGS. 1 through 5, the electrical energy generator 10 generally comprises a support assembly 11,32,37 having a support standard 32 and an elongate support member 11 being mounted upon the support standard 32 with brackets 33.

A rotor assembly 12-16 is rotatably and conventionally disposed upon the support assembly 11,32,37 and has a rotor member 12 being disc-shaped and having a hole 15 being disposed through an axis thereof with a bearing being conventionally disposed in the hole 15 and about the elongate support member 11 with a plurality of vanes 16 being conventionally attached to the rotor member 12 and being movable by air for rotating the rotor assembly 12-16 The rotor assembly 12-16 also includes a plurality of magnets 13,14 being conventionally attached to the disc-shaped rotor member 12 with the magnets 13,14 being arranged to form two rows of magnets 13,14. The rows of magnets 13,14 are circumferentially arranged upon the disc-shaped rotor member 12 and include an outer circumferential row of the magnets 13 being disposed proximate to and along a length of a rim 35 of the disc-shaped rotor member 12 and also include an inner circumferential row of the magnets 14 being radially spaced inside the outer circumferential row of/the magnets 13. The inner and outer circumferential rows of the magnets 13,14 are in planar alignment to one another thus creating a magnetic field between the inner and outer circumferential rows of the magnets 13,14.

A stator assembly 17-26 is mounted upon the support assembly 11, 32,37 and includes a stator member 17 being movably disposed upon the support assembly 11,32,37 for generating energy in cooperation with the rotor assembly 12-16. The stator assembly 17-26 includes a stator member 17 and also includes a plurality of conductive coil members 26 being conventionally attached to the stator member 17. The stator member 17 is disc-shaped and has a plurality of holes 18-20 being disposed therethrough. One of the holes 18 is disposed through an axis of the stator member 17 with a bushing 23 being conventionally disposed in the hole 18 and being movably disposed about the elongate support member 11. The stator assembly 17-26 also includes elongate stabilizing members 21,22 being securely and conventionally disposed upon the support assembly 17-26 with a mount 37 and being disposed through the other holes 19,20 of the stator member 17 to prevent the stator member 17 from rotating about the elongate support member 11. The stator member 17 is movable linearly upon the elongate stabilizing members 21,22. The conductive coil members 26 are spacedly attached proximate to and along a length of a rim 38 of the disc-shaped stator member 17 and extend outwardly and perpendicular to the disc-shaped stator member 17 and are arranged to form a circumferential row.

Figure 5:
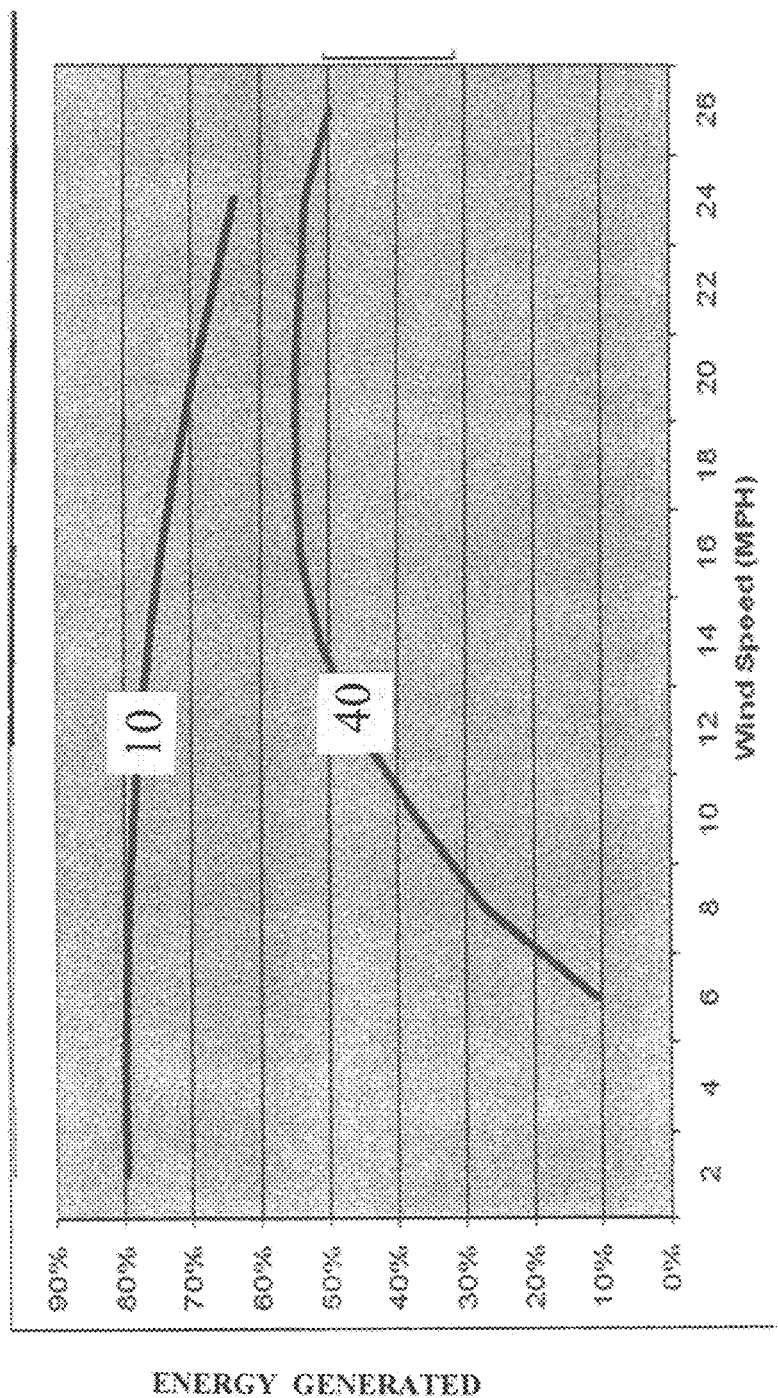
FIG. 5 is a chart comparing the energy generated by a conventional turbine and the present invention at various wind speeds.

A means for moving the stator member 17 relative to the rotor assembly 12-16 upon the support assembly 11, 32,37 includes an actuator 27 such as an electrical motor being conventionally disposed upon the support assembly 11,32,33 and being in communication to the stator member 17 via a screw 28 which is securely and conventionally connected to the stator member 17. The means for moving the stator member 17 also includes a microprocessor 29 being in conventional communication via wires to the actuator 27 and to a power supply 39 for energizing the actuator 27 to move the stator member 17 linearly along the elongate support member 11 and to move the conductive coil members 26 relative to the magnetic field and to the inner and outer circumferential rows of the magnets 13,14 as determined by the wind speed. The means for moving the stator member 17 further includes a sensor 30 being in conventional communication via wires to the microprocessor 29 for sensing wind speed and communicating the wind speed to the microprocessor 29; whereupon the microprocessor 29 is programmed to take the wind speed from the sensor 30 and whether or not the conductive coil members 26 are beginning to heat up and calculate the positioning of the conductive coil members 26 relative to the magnetic field. Once the calculation is made, the microprocessor 29 energizes the actuator 27 to linearly move the stator member 17 to position the conductive coil members 26 relative to the magnetic field generated by the inner and outer circumferential rows of the magnets 13,14 for optimal electrical energy generation upon the conductive coil members 26 passing through the magnetic field. The circumferential row of the conductive coil members 26 is adjustably positioned along a predetermined continuum relative to the magnetic field with the continuum including the circumferential row of the conductive coil members 26 being in planar alignment with the inner and outer circumferential rows of magnets 13,14 and being completely immersed in the magnetic field between the inner and outer circumferential rows of magnets 13,14 and also being at least partially removed from between the inner and outer circumferential rows of magnets 13,14 with only a portion of the circumferential row of the conductive coil members 26 being immersed in the magnetic field. The circumferential row of the conductive coil members 26 is adjustably positioned relative to the magnetic field in dependence upon the wind speed; at moderate wind speeds in the range of 8 to 18 mph, the circumferential row of the conductive coil members 26 being completely immersed in the magnetic field between the inner and outer circumferential rows of magnets 13,14 for optimal electrical energy generation; at low wind speeds of less than 8 mph or at high wind speeds of more than 18 mph, the circumferential row of the conductive coil members 26 being at least partially removed from between the inner and outer circumferential rows of magnets 13,14 with the portion of the circumferential row of the conductive coil members 26 being immersed in the magnetic field to reduce magnetic drag placed on the rotor member 12 from the interaction of the conductive coil members 26 and the magnets 13,14 so that the rotor member 12 can rotate at low wind speeds and generate optimal efficient electrical energy without the conductive coil members 26 building up heat and losing efficient electrical energy at high wind speeds. As shown in FIG. 5, conventional turbines 40 do not generate any electrical energy at low wind speeds because the conductive coil members 26 create a load or drag on the rotor member 12, because the conductive coil members 26 are positioned in the magnetic field and wind speeds of 7 mph or more are needed to rotate the rotor member 12; whereas, in the present invention, since the conductive coil members 26 can be removed from the magnetic field thus lessening the drag or load on the rotor member 12, the rotor member 12 rotates at wind speeds of 2 mph and electrical energy is created. Also, the efficiencies of conventional wind turbines 40 creating electrical energy inefficiencies at high wind speeds because the conductive coil members 26 become hot and lose its effectiveness; whereas, in the present invention, even at high wind speeds, the effectiveness of creating efficient electrical energy remains high, because the conductive coil members 26 are moved relative to the magnetic field to prevent heat buildup in the conductive coil members 26.

In use, the sensor 30 detects the wind speed and whether or not the conductive coil members 26 are beginning to heat up and communicates that information to the microprocessor 29 which assimilates the data and calculates where the conductive coil members 26 should be positioned relative to the magnetic field between the inner and outer circumferential rows of magnets 13,14 for optimal efficient electrical energy generation. The microprocessor 29 then energizes the actuator 27 which moves the stator member 17 and the conductive coil members 26 upon the elongate support member 11 depending upon the wind speed and whether or not the conductive coil members 26 are heating up. At moderate wind speeds with the conductive coil members 26 not heating up, the conductive coil members 26 are adjustably positioned with the conductive coil members 26 being completely immersed in the magnetic field. At high wind speeds and with the conductive coil members 26 beginning to heat up as detected by the sensor 30, only a portion of the circumferential row of the conducive coil members 26 is immersed in the magnetic field with the conductive coil members 26 being at least partially removed from between the inner and outer circumferential rows of magnets 13,14. The air moving at low, moderate or high speeds moves the vanes which rotates the magnets 13,14 relative to the conductive coil members 26 thus generating optimal electrical energy.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the electrical energy generator. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electrical energy generator comprising:
   a support assembly having an elongate support member:
   a rotor assembly being rotatably disposed upon said support assembly and having a plurality of vanes being movable by air for rotating said rotor assembly, said rotor assembly including a rotor member, said rotor assembly also including a plurality of magnets being attached to said rotor member with said magnets being arranged to form two rows of said magnets, said rows of said magnets including an outer circumferential row of said magnets and also including an inner circumferential row of said magnets being spaced from said outer circumferential row of said magnets: wherein said inner and outer circumferential rows of said magnets being in alignment to one another thus creating a magnetic field between said inner and outer circumferential rows of said magnets:
   a stator assembly being mounted upon said support assembly and including a stator member being movably disposed upon said support assembly for generating energy in conjunction with said rotor assembly and including a plurality of conductive coil members being attached to said stator member; and
   a means for moving said stator member relative to said rotor assembly upon said support assembly and including an actuator being disposed upon said support assembly and being connected to said stator member, said means for moving said stator member also including a microprocessor being in communication to said actuator and to a power supply for energizing said actuator to move said stator member linearly along said elongate support member and to move said conductive coil members relative to the magnetic field and to said inner and outer circumferential rows of said magnets depending upon the wind speed.

2. The electrical energy generator as described in claim 1, wherein said means for moving said stator member further includes a sensor being in communication to said microprocessor for sensing wind speed and communicating the wind speed to said microprocessor; whereupon said microprocessor energizes said actuator to linearly move said stator member to optimally position said conductive coil members relative to the magnetic field generated by said inner and outer circumferential rows of said magnets for optimal electrical energy generation depending upon the wind speed.

3. The electrical energy generator as described in claim 2, wherein said circumferential row of said conductive coil members is adjustably positioned along a continuum relative to the magnetic field, said continuum including said circumferential row of said conductive coil members being completely immersed in the magnetic field between said inner and outer circumferential rows of said magnets and also including a portion of said circumferential row of said conductive coil members being immersed in the magnetic field with said circumferential row of said conductive coil members being at least partially removed from between said inner and outer circumferential rows of said magnets.

4. The electrical energy generator as described in claim 3, wherein said circumferential row of said conductive coil members is adjustably positioned relative to the magnetic field depending upon the wind speed; at moderate wind speeds, said circumferential row of said conductive coil members being completely immersed in the magnetic field between said inner and outer circumferential rows of said magnets for optimal electrical energy generation; at low or high wind speeds, said circumferential row of said conductive coil members being at least partially removed from between said inner and outer circumferential rows of said magnets with said portion of said circumferential row of said conductive coil members being immersed in the magnetic field to reduce magnetic drag placed on said rotor member so that said rotor member can rotate at low wind speeds and at high speed wind speeds to prevent heat buildup of said conductive coil members for optimal electrical energy generation.

5. A method of generating optimal energy using an electrical energy generator which comprises a support assembly, a rotor assembly being rotatably disposed upon the support assembly and including a rotor member with inner and outer circumferential rows of magnets being attached to the rotor member and including vanes being movable by air, a stator assembly including a stator member being movable upon the support assembly with conductive coil members being attached to the stator member, an actuator being in communication to the stator member, a microprocessor being in communication to the actuator and to a power supply, and a sensor being in communication to the microprocessor; wherein the method of generating optimal energy includes the steps of:
   sensing wind speed using the sensor;
   communicating the wind speed to the microprocessor;
   adjustably positioning the conductive coil members relative to the inner and outer circumferential rows of magnets; and
   generating electrical energy upon air moving the vanes with the magnets rotating relative to the conductive coil members.

6. The method of generating optimal energy using an electrical energy generator as described in claim 5, wherein said adjustably positioning the conductive coil members includes the step of energizing the actuator to move the conductive coil members depending upon the wind speed.

7. The method of generating optimal energy using an electrical energy generator as described in claim 6, wherein said energizing the actuator includes the step of adjustably positioning the conductive coil members along a continuum relative to the magnets, the continuum including the conductive coil members being completely immersed in the magnetic field between the inner and outer circumferential rows of magnets and also including a portion of the circumferential row of conducive coil members being immersed in the magnetic field with the conductive coil members being partially removed from between the inner and outer circumferential rows of magnets.

8. The method of generating optimal energy using an electrical energy generator as described in claim 7, wherein said adjustably positioning the conductive coil members includes the step of completely immersing the conductive coil members in the magnetic field between the inner and outer circumferential rows of magnets at moderate wind speeds.

9. The method of generating optimal energy using an electrical energy generator as described in claim 7, wherein said positioning the conductive coil members includes the step of partially removing the conductive coil members from between the inner and outer circumferential rows of magnets with a portion of the circumferential row of the conducive coil members being immersed in the magnetic field between the inner and outer circumferential rows of magnets at low or high wind speeds.

10. The method of generating optimal energy using an electrical energy generator as described in claim 5, wherein said generating electrical energy includes the step of air rotating the magnets with the conductive coil members being completely immersed in the magnetic field between the inner and outer circumferential rows of magnets.

11. The method of generating optimal energy using an electrical energy generator as described in claim 5, wherein said generating electrical energy includes the step of air rotating the magnets with the conductive coil members being at least partially removed from between the inner and outer circumferential rows of magnets with a portion of the circumferential row of the conducive coil members being immersed in the magnetic field to reduce the drag on the rotor member at low wind speeds and to prevent heat buildup of the conductive coil members at high wind speeds.

\* \* \* \* \*